(12) United States Patent
Wolf et al.

(10) Patent No.: US 12,345,725 B2
(45) Date of Patent: Jul. 1, 2025

(54) RACK FOR AUTOMATED ANALYZER

(71) Applicants: STRATEC SE, Birkenfeld (DE); INSTRUMENTATION LABORATORY COMPANY, Bedford, MA (US)

(72) Inventors: Ralf Wolf, Neuenburg (DE); Christopher Almy, Jr., Bedford, MA (US); Joshua A Shreve, Bedford, MA (US); Candice Bell, Bedford, MA (US); Benjamin E Newton, Bedford, MA (US)

(73) Assignees: STRATEC SE, Birkenfeld (DE); Instrumenation Laboratory Company, Bedford, MA (US)

( * ) Notice: Subject to any disclaimer, the term of this patent is extended or adjusted under 35 U.S.C. 154(b) by 155 days.

(21) Appl. No.: 16/953,720

(22) Filed: Nov. 20, 2020

(65) Prior Publication Data
US 2021/0156877 A1 May 27, 2021

(30) Foreign Application Priority Data

Nov. 22, 2019 (LU) ........................................ 101493

(51) Int. Cl.
*G01N 35/02* (2006.01)
*B01L 9/00* (2006.01)
(Continued)

(52) U.S. Cl.
CPC .............. *G01N 35/026* (2013.01); *B01L 9/54* (2013.01); *G01N 35/00732* (2013.01);
(Continued)

(58) Field of Classification Search
CPC ........... G01N 35/026; G01N 35/00732; G01N 35/04; G01N 2035/00752; G01N 2035/00801; G01N 2035/0413; B01L 9/54; B01L 2300/021; B01L 2200/021; B01L 2200/023; B01L 2200/025; B01L 2200/04;
(Continued)

(56) References Cited

U.S. PATENT DOCUMENTS

| 10,350,324 B1 | 7/2019 | Anderson et al. |
| 2006/0266719 A1 | 11/2006 | Hipolito et al. |

(Continued)

FOREIGN PATENT DOCUMENTS

| CN | 107913752 A | * 4/2018 | ................ B01L 9/06 |
| CN | 108057465 A | * 5/2018 | ................ B01L 9/06 |

(Continued)

*Primary Examiner* — Jill A Warden
*Assistant Examiner* — John McGuirk
(74) *Attorney, Agent, or Firm* — 24IP Law Group USA, PLLC; Timothy R. DeWitt (57) ABSTRACT

A rack for automated analyser systems and provides a rack for automated analyser systems, the rack comprising a main body having an extended front side and a corresponding extended reverse side as well as at least two side walls defining at least one opening that is accessible from the main body's upper side for taking up a container for a sample that is to be processed; an upper insert that is arranged onto an upper end of the main body, wherein the upper insert has openings with a predefined diameter defining the upper surface of the rack.

12 Claims, 5 Drawing Sheets

(51) Int. Cl.
　　　*G01N 35/00*　　　(2006.01)
　　　*G01N 35/04*　　　(2006.01)
(52) U.S. Cl.
　　　CPC ........ *G01N 35/04* (2013.01); *B01L 2300/021* (2013.01); *G01N 2035/00752* (2013.01); *G01N 2035/00801* (2013.01); *G01N 2035/0413* (2013.01)
(58) Field of Classification Search
　　　CPC ......... B01L 2300/024; B01L 2300/041; B01L 2300/0609; B01L 2300/0851; B01L 2300/0858; B01L 9/543; B01L 9/06
　　　See application file for complete search history.

(56) References Cited

U.S. PATENT DOCUMENTS

2017/0023561 A1\* 1/2017 Martinell Gispert-Sauch ............. G01N 35/026
2020/0064363 A1\* 2/2020 Perry ..................... G01N 35/10
2021/0389338 A1\* 12/2021 Kochar .................... B01L 9/06

FOREIGN PATENT DOCUMENTS

EP　　　　　3136109 A1　　3/2017
KR　　　101847998 B1 \*　4/2018

\* cited by examiner

RACK FOR AUTOMATED ANALYZER

CROSS-REFERENCE TO RELATED APPLICATION

The present application claims priority to Luxembourg Patent Application No. LU 101493 filed on Nov. 22, 2019. The aforementioned application is hereby incorporated by reference in its entirety.

BACKGROUND OF THE INVENTION

Field of the Invention

The invention relates to a rack for automated analyser systems.

Brief Description of the Related Art

Automated analyser systems for use in clinical diagnostics and life sciences are produced by a number of companies. For example, STRATEC® SE, Birkenfeld, Germany, produces a number of devices for specimen handling and detection for use in automated analyser systems and other laboratory instrumentation.

Sample fluids for in-vitro diagnostic are usually loaded in said automated analyzers loaded in special sample tubes, called tubes. The samples may be body liquids of different origin, like blood, plasma, urine etc. The tubes are loaded into the automated analyzers by specific carrier modules, so-called racks, which allow to load a number of tubes together in groups.

The tubes may have different shapes and sizes, depending on the volume of the sample and assay that is to be performed. A flat side wall of a tube may be required for optical measurements, whereas a circular shape be advantageous for samples or reaction mixtures that have to be stirred. Due to the variety of existing tubes, there are a variety of racks available, which are able to carry a specific kind of tubes with a certain diameter (or within a diameter range). The Clinical and Laboratory Standards Institute (CLSI) provides standards for laboratory equipment like sample tubes in different sizes.

The use of different tubes and as a consequence of different racks for carrying those tubes increases the effort in material that has to be available in a lab. It further complicates loading and handling of samples, because appropriate carrier or trays for use in an automated analyzer system will have to be used.

Published European Patent Application No. 3 136 109 A1 to a vessel holder of an automated analysis system, the insert comprising at least one first gripping element configured to elastically engage with a vessel at a first position of the vessel when the vessel is being inserted into the vessel holder, at least one second gripping element configured to elastically engage with a vessel at a second position of the vessel when the vessel is being inserted into the vessel holder, a central portion arranged between the first and second gripping elements, the at least one first gripping element and the at least one second gripping element being attached to the central portion. The sample holder according to this document is not intended for adapting a slot or compartment to the diameter and/or height of a receptacle that is to be inserted into a slot.

U.S. Patent Application Publication No. US 2006/266719 A1 relates to a sample tube holder having sample tube compartments with sets of spaced finger springs provided therein for maintaining sample tubes in substantially upright orientations. A guide structure having a series of openings is used to direct sample tubes into the sample tube compartments and to restrict lateral movement of sample tubes held thereby. A retainer is releasably engaged by the guide structure and has openings sized to provide access to sample tubes held by the sample tube compartments but which restrict vertical movement of the sample tubes. Tabs at a base of the sample tube holder and hold-downs fixed to a stationary structure adjacent a conveyor cooperate to restrict vertical movement of the sample tube holder during automated sampling procedures. The device according to this document comprises multiple parts so that it represents a very complex sample holder.

U.S. Pat. No. 10,350,324 B1 discloses a microfluidic cartridge and a microfluidic delivery device having a housing and a microfluidic cartridge releasably connectable with the housing are provided. The microfluidic cartridge includes a reservoir for containing a fluid composition, a first face, and a second face joined with the first face. The electrical circuit has a first end portion and a second end portion. The first end portion of the electrical circuit is disposed on the first face and the second end portion of the electrical circuit is disposed on the second face. The first end portion includes electrical contacts and one or more circuit minor openings that are configured to mate with minor guideposts on the housing of a microfluidic delivery device. The microfluidic cartridge may include one or more major openings that are configured to mate with major guideposts on the housing. The microfluidic cartridge includes a microfluidic die disposed on the second face. The device according to this document does not relate to a sample holder and more particularly not to a sample holder which is not suitable for being adapted to take up receptacles with different diameter.

A disadvantage of the solutions known from the state of the art is thus that a rack supports only one particular size and/or shape, because the centering of tubes with different diameters does not sufficiently work. Racks known from the prior art use often retaining springs that engage quite far down with the tube, so that small angular tolerances in that area of the spring and the tube bottom have a significantly larger impact regarding centering. This is specifically a problem for the pipetting process. Finally, it is disadvantage from known solution that the racks are not conductive, which is why it is not possible to use capacitive liquid level detection with racks known from the prior art.

SUMMARY OF THE INVENTION

The object of the present invention is to provide a rack that allows to load and carry appropriately tubes of different shapes and sizes.

The present invention provides a rack for automated analyser systems, the rack comprising a main body having an extended front side and a corresponding extended reverse side as well as at least two side walls defining at least one slot with at least one first opening that is accessible from the main body's upper side for taking up a container for a sample that is to be processed; an upper insert that is arranged onto an upper end of the main body, wherein an upper surface of the upper insert has at least one second opening with a predefined diameter defining the upper surface of the rack.

In a further aspect of the invention, the main body comprises recesses 4 which are substantially horizontally arranged (within the meaning that they will not have to be exactly horizontal) in the at least two side walls of the at least one first opening for inserting horizontally a lower insert.

In another embodiment of a rack according to the invention, it may comprise a lower insert that is inserted into opposite recesses 4 in the at least two side walls in the at least one first opening.

It is further envisaged that the lower insert may have a horizontal surface with at least one third opening for centring tubes passing said at least one first and second opening or wherein the lower insert has a horizontal surface for reducing the available height of the at least one first and second opening going from said horizontal surface of the lower insert to the upper end of the upper insert.

A further aspect of the invention relates to a rack, wherein the openings of an upper insert may have a predefined geometry selected from the group comprising circular, elliptic, rectangular, quadratic or rhomboid.

A further embodiment provides a rack, wherein the main body is made of an electrically conductive material.

The invention refers further to a rack with at least two lower inserts with at least one third opening which are placed in the at least one opening.

It is further envisaged that the reverse side of a rack according to the invention has a position for an RFID tag.

In a further aspect of the invention, the front side and/or a smaller end wall may have a position for barcodes.

The smaller end wall of a rack may further comprise a magnet for detection of the rack.

It is further envisaged that the at least one second opening of the upper insert may comprise a whole tube insert having a smaller volume than the slot for taking up receptacles.

Finally, in another embodiment of a rack of the invention, the rack may have at its underside at least one recess for taking up protrusions of a conveyer belt.

Another object of the present invention refers to the use of a rack as described above in automated analyser systems for processing, analysing or diagnosing samples.

Still other aspects, features, and advantages of the present invention are readily apparent from the following detailed description, simply by illustrating preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description or may be learned by practice of the invention.

BRIEF DESCRIPTION OF THE FIGURES

The invention will be described based on figures. It will be understood that the embodiments and aspects of the invention described in the figures are only examples and do not limit the protective scope of the claims in any way. The invention is defined by the claims and their equivalents. It will be understood that features of one aspect or embodiment of the invention can be combined with a feature of a different aspect or aspects of other embodiments of the invention, in which:

DETAILED DESCRIPTION OF THE INVENTION

The technical problem is solved by the technical features of the independent claims. The dependent claims cover further specific embodiments of the invention.

The main body of a rack has at least one slot or compartment (or having multiple slots or compartments) with at least one first opening (or multiple openings) at the upper end, wherein a slot or compartment is substantially vertical so that a receptacle can be inserted. A receptacle according to the invention comprises a reaction vessel or tube like a sample tube, container, bottle or test tube for taking up a liquid.

A sample, reaction mixture or patient sample according to the present invention designates a liquid that is to be processed, analyzed or diagnosed. A sample may be liquid or a liquid that comprises solids like beads, e.g. magnetic beads. A sample may be or comprise a body liquid or parts of it comprising for instance blood, plasma, urine that have been retrieved before.

The present invention provides a rack that allows to load and carry tubes of different sizes and shapes according to the CLSI standards. The upper end of the rack carries an upper insert with at least one second opening having a diameter adapted to the receptacle that is inserted into the slot. The advantage of a rack according to the present invention is that the costs for manufacturing of racks and their purchase are reduced. In addition, a lab gets a fully configured rack, that can be used for racks of different sizes and shapes which makes the handling of tubes by far easier for a user.

It is particularly important to provide a rack that keeps the tubes centered in a so-called receiving position of the rack so that liquids can be reliably removed from the respective tube even when tubes with different diameters are to be processed by a pipetting robot.

A rack according to the present invention allows furthermore the reading of barcodes attached on the rack as well as the recognition of various tube parameters, e.g. diameter, height, lid type, lid color, level or phase transitions. The rack has further features that enable a good manual and automated handling which are described below.

It is envisaged that an appropriate material for the rack can be chosen, comprising the use of electrically conductive plastics so that capacitive liquid level detection (CLLD) in the tubes will be possible.

The core of the present invention refers to a modular design in terms of a multi part design for supporting different tube diameters in a single rack. The rack may also be adaptable to different heights of tubes. The rack may further be made of an electrically conductive material. Further features of a rack according to the invention refer to cut-outs or windows in the surface of the front side, along a slot into which the tubes are placed so that measuring processes may be performed through the cut-out or window while a tube is placed into a rack's slot. In order to allow illumination or excitation of fluorescence in a sample, a reverse side opposite the front side of the rack may also have cut-outs or windows.

The racks according to the present invention can be labelled with a RFID tag for providing information like the content of a tube, a location within an automated analyzer where the tube or all tunes of a rack have to be transported or about the respective analytical assay that has to be performed with the content of a tube or the tubes of a rack.

The requirement to allow placement of several tube of a different type in terms of their size and/or shape types in one rack is solved by the modular design. A main body of a rack, which always remains the same, has certain vertical spaces or slots for accommodating a receptacle like a tube, and the adaptation to different types of tubes is achieved by means of specific inserts.

Figure 1:
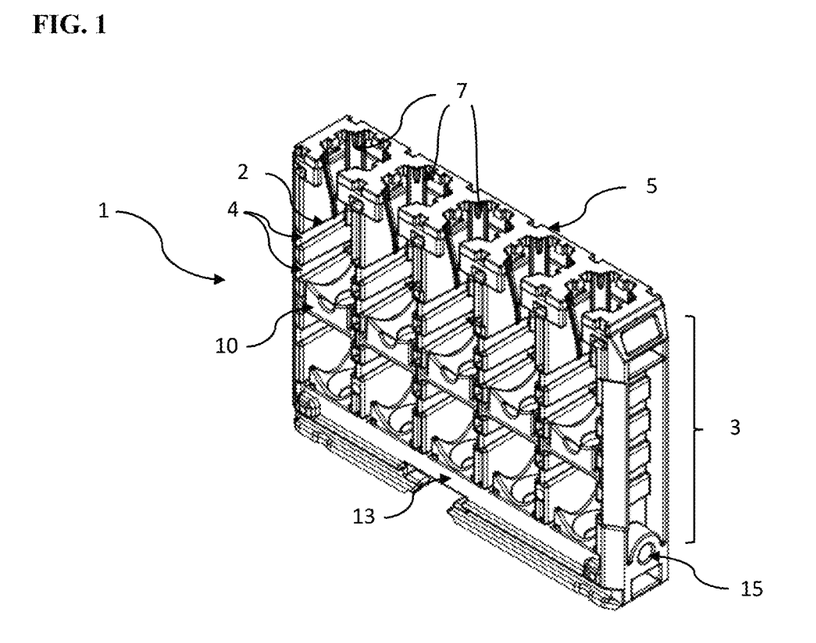
FIG. 1 shows a perspective view onto an extended front side of a rack.

FIG. 1 shows a front side of a rack 1 with an upper insert 5, which is located at the top of the rack 1 for adapting the diameter of the upper openings of a slot 3 to different tube diameters with second openings 7. It is intended that an upper insert 5 provides second openings 7 for diameter certain ranges, e.g. from 10 mm to 13 mm or 13 mm to 16 mm.

Figure 3A:
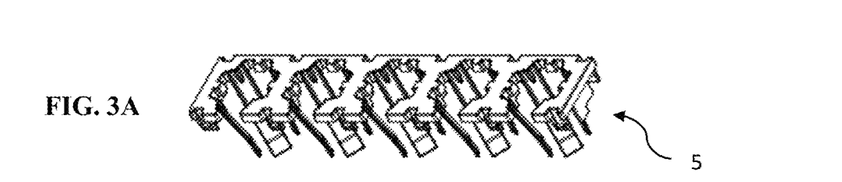
FIGS. 3A, 3B and 3C show different embodiments of upper inserts.
Figure 3B:
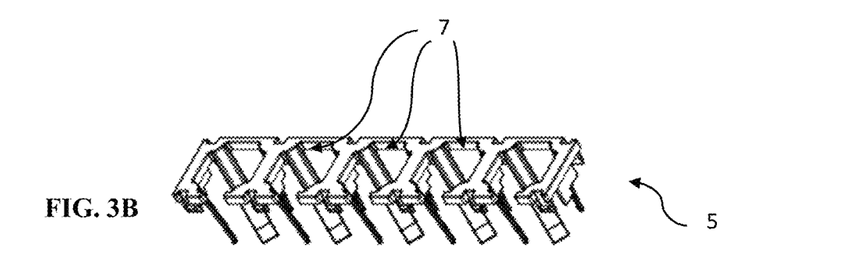
Figure 3C:
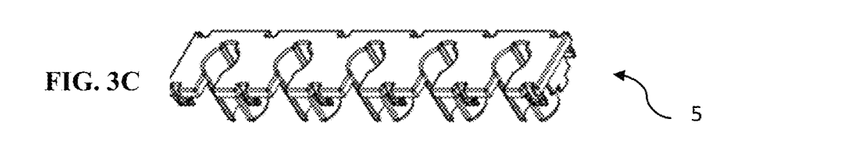

The second openings 7 of the upper inserts 5 may also have a specific geometry allowing only insertion of a tube with a corresponding outer geometry which may be circular, elliptic, rectangular, quadratic or a combination thereof. FIG. 3A shows an upper insert 5 for accommodating tubes with an outer diameter between 10 to 13 mm. FIG. 3B shown an embodiment of an upper insert for tubes with an outer diameter between 13 to 16 mm and FIG. 3C shows an upper insert for hanging tubes into it. Such tubes do not stand on a lower insert 10 or the bottom side of a rack's opening (FIG. 1) but they are attached with their upper end having a collar for instance, to the upper insert 5.

A lower insert 10 for the adjustment of the height of a rack's slot 3 is shown in FIG. 1. A lower insert 10 can be attached or inserted like a substantially horizontal drawer in different heights in a rack's 1 side walls, so that the available height for a tube of a slot 3 goes from a lower insert 10 to the upper end of the upper insert 5. It is also within the scope of the present invention that a lower insert 10 may have a tilt.

Figure 2:
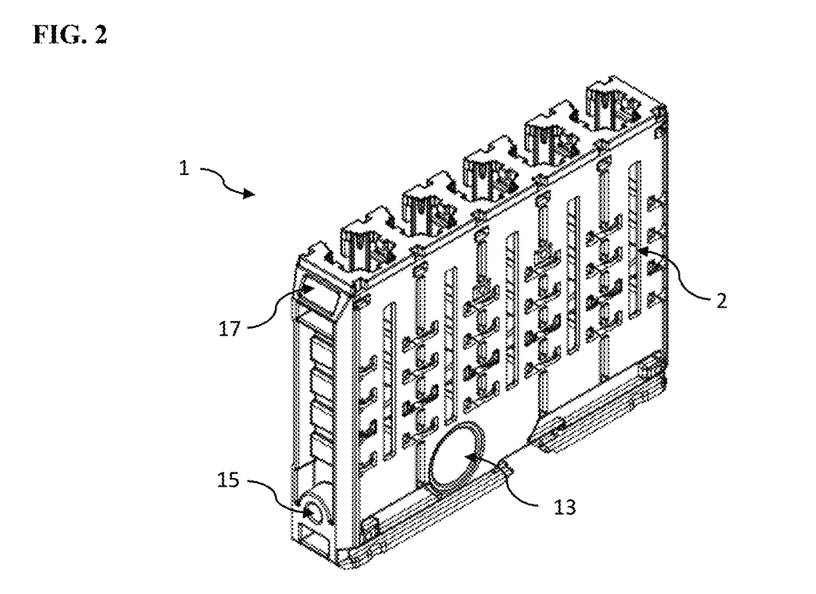
FIG. 2 shows a perspective view onto an extended reverse side of a rack.

FIG. 2 shows a reverse side of a rack 1. The front side (FIG. 1) has larger cut-outs or windows 2 along slots 3 in its surface than the reverse side. FIG. 2 shows a position for a RFID label 13. The rack may provide further recesses or areas for codes or label 17 on its front side as well as on its reverse side. Said codes or labels may serve for automated detection by a camera for example.

A magnet 15 (FIG. 1 and FIG. 2) may also be applied to a rack for its identification or its detection—through a hall sensor for instance—after placing it into a loading area of a device like an automated analyzer or a member of an automated analyzer for loading racks with sample tubes.

Figure 4:
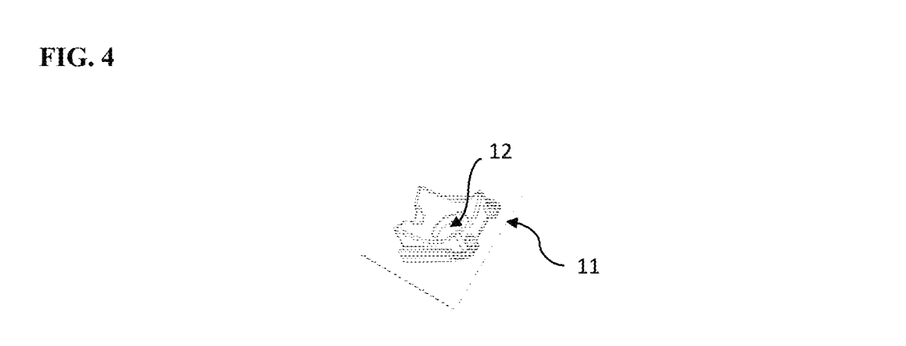
FIG. 4 shows an embodiment of a lower insert.

FIG. 4 shows in detail an open lower insert 11 with a third opening 12.

Figure 5:
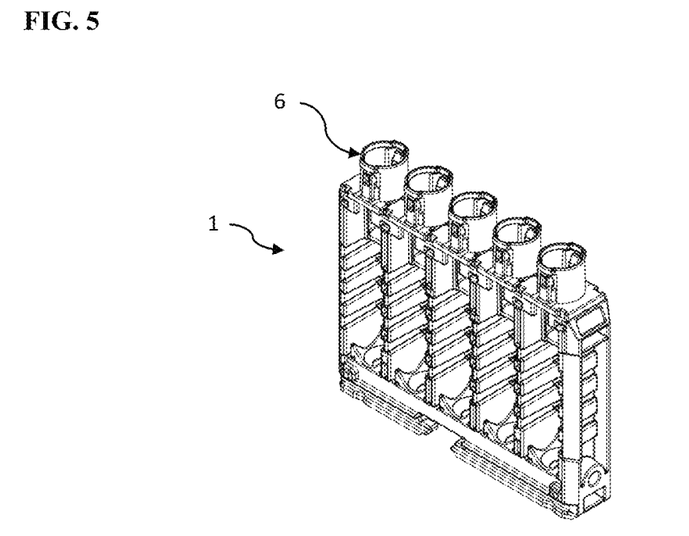
FIG. 5 shows a rack with a whole tube insert.
Figure 6:
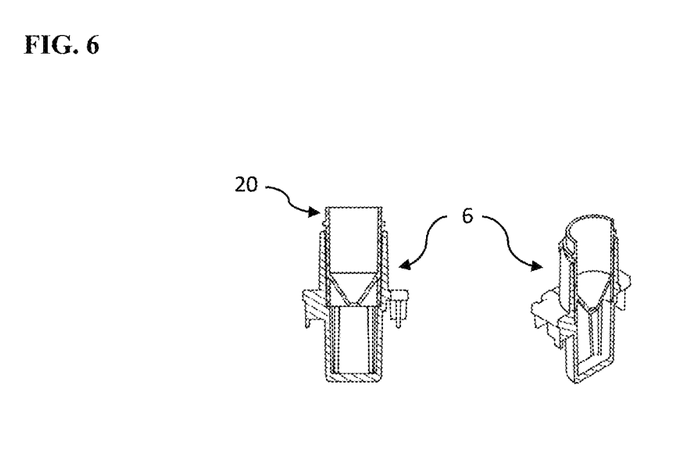
FIG. 6 shows sectional views of the whole tube insert.

The embodiment of a rack 1 according to the invention shown in FIG. 5 comprises whole tube upper inserts 6 for very small tubes. A sectional view of such whole tube upper inserts 6 with tube 20 is depicted in FIG. 6. The whole tube upper insert 6 provides enough space to take up a single tube 20 completely that fits tight in the upper opening of the whole tube upper insert 6.

Figure 7:
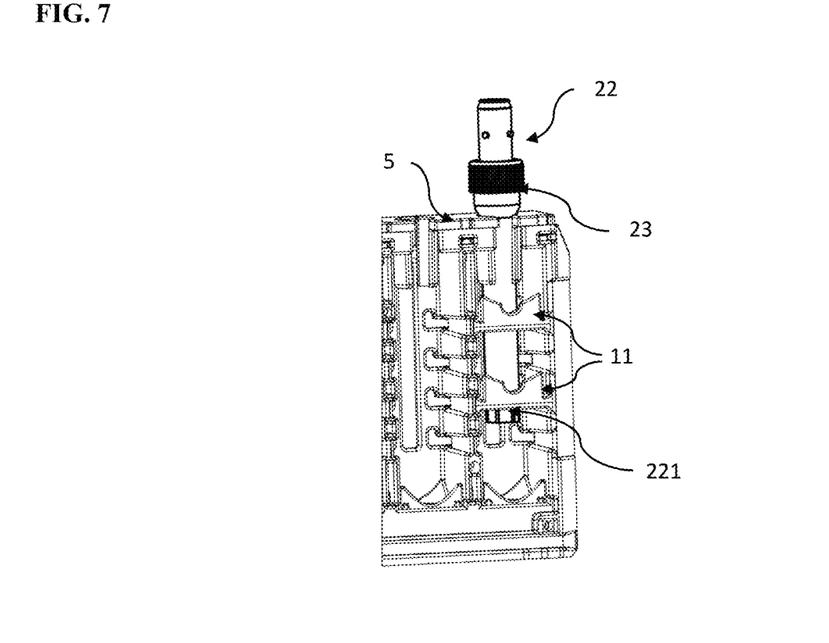
FIG. 7 shows a part of a rack with a hanging tube and two open lower inserts.

FIG. 7 shows with respect to the already above-mentioned hanging tubes 22 an embodiment of such a hanging tube 22. In contrast to inserted tube that stand on the lower insert 10 or bottom side of a rack's opening (not shown) the hanging tube 22 is inserted through the upper insert 5 and attaches with its collar 23 to the upper insert 5 where it is stopped and prevented from reaching the openings bottom side. A hanging tube 22 is centered through the lower inserts 11, which have an opening 12 through that the tip 221 of the hanging tube 22 passes. The diameter of opening 12 (not visible) corresponds with the outer diameter of the respective tube so that the hanging tube 22 is centered in slot 3 and its collar 23 attaches to upper insert 5. Again, the diameter of opening 12 (not visible) may be appropriate for different sized hanging tubes 22.

FIG. 7 shows two open lower inserts 11 arranged in a slot 3 for centering of the hanging tube 22. The exemplary design shown inn FIG. 7 allows for capacitive liquid level determination if the material of the rack 7 is electrically conductive. The use of a plurality of open lower inserts 11 makes the capacitive coupling between a liquid in the hanging tube 22 and ground easier.

Figure 8:
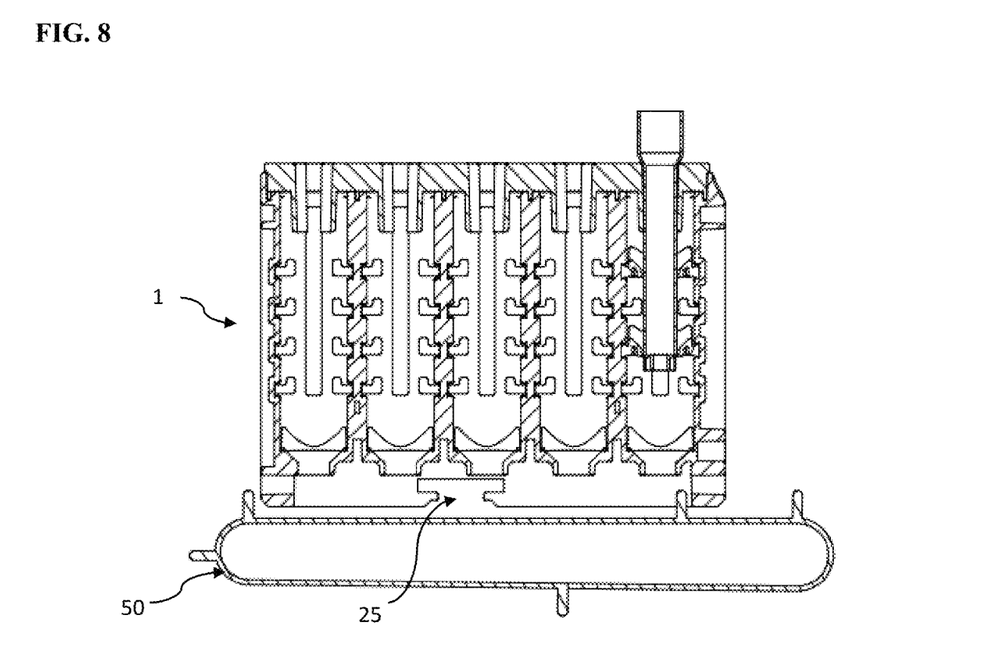
FIG. 8 shows a rack onto a conveyer belt.

For the automatic handling of the rack 1 in an automated analyzer system, there is a T-shaped groove 25 in the lower part of the rack 1 and special features for the engagement of a toothed conveyer belt 50 (FIG. 8).

Figure 9:
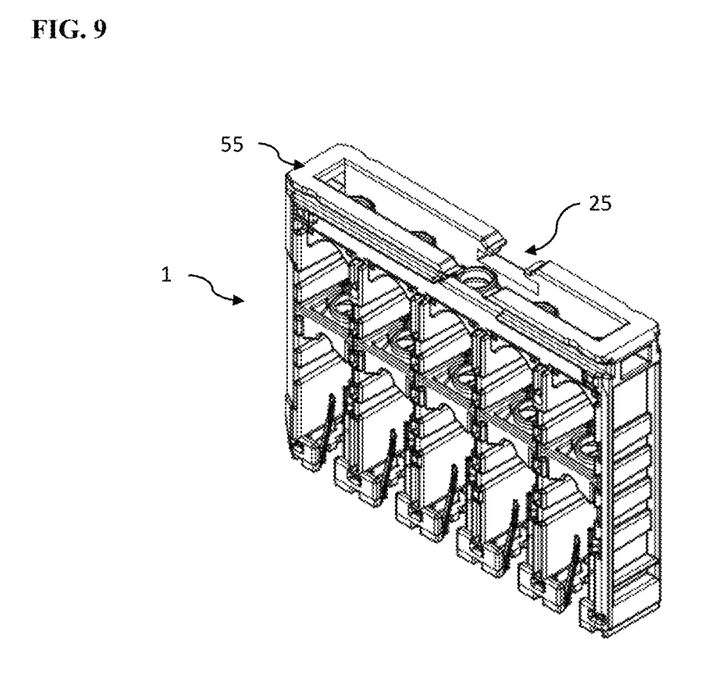
FIG. 9 shows the lower side of a rack.

FIG. 9 shows the lower side of a rack 1 with the T-shaped groove 25. Protrusions of a toothed conveyer belt (not shown) may engage for moving rack 1 into frame 60 surrounding the underside of the rack 1. The T-shaped groove is part of frame 60. The shape and size of frame 60 as well as of T-shaped groove 25 may be adapted to specific requirements.

An advantage of a rack according to the present invention is that a variety of commonly used sample tubes according to CLSI standards can be used in a single rack. The rack allows for manual and automated handling. In addition, the rack is adapted to systems with camera-based readers, code readers or RFID readers or a combination thereof. It is further possible to use a CLLD sensor if the rack is made of electrically conductive material. This functionality may be improved regarding the CLLD by the use of multiple open lower inserts for hanging tubes. A rack according to the invention provides numerous interfaces for automated handling in a single device.

Alternative approaches may encompass the use of other sensors like photoelectric sensors, etc. instead of using a Hall sensor for detecting a rack in the automated analyzer system or a loading member for racks. A rack according to the invention is not limited to take up five sample tubes. The rack may also have a plurality of rows or even have a circular shape.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

REFERENCE NUMERALS 1 rack
2 cut-out/window 3 slot
4 recess
5 upper insert
6 whole tube upper insert
7 second opening
10 lower insert
11 open lower insert
12 third opening
13 position RFID label
15 magnet
17 area for codes or label
20 tube
22 hanging tube
221 tip hanging tube
23 collar
25 T-shaped groove
50 toothed conveyer belt
60 frame

What is claimed is:

1. A rack for automated analyser systems, the rack comprising:
   a main body having an extended front side, a corresponding extended reverse side, and a plurality of side walls;
   a plurality of slots in the main body of the rack defined by the extended front side, the corresponding extended reverse side, and the plurality of side walls, each slot comprising a substantially rectangular first opening at an upper end, wherein the slot is accessible from an upper side of the main body to receive a container comprising a sample and the side walls defining each slot comprise a plurality of horizontally arranged recesses to receive a horizontal lower insert; and
   a single upper insert that is arranged at the upper side of the main body, the single upper insert comprising a plurality of second openings, each second opening corresponding to one of the substantially rectangular first openings and defining a centered diameter in the corresponding substantially rectangular first opening for receiving the container comprising the sample, wherein the centered diameter is centered with respect to a longitudinal axis of the corresponding slot.

2. The rack of claim 1, further comprising one or more horizontal lower inserts, each horizontal lower insert arranged in opposite horizontally arranged recesses of one of the plurality of slots.

3. The rack of claim 2, wherein each lower insert has a horizontal surface with at least one third opening configured for centering tubes passing said at least one first and second opening or wherein each lower insert has a horizontal surface configured for reducing the available height of the at least one first and second opening going from said horizontal surface of the lower insert to the upper end of the upper insert.

4. The rack of claim 1, wherein the at least one second opening of the single upper insert has a predefined geometry selected from the group consisting of circular, elliptic, rectangular, quadratic, and rhomboid.

5. The rack of claim 1, wherein the main body is made of an electrically conductive material.

6. The rack of claim 1, further comprising at least two lower inserts with at least one third opening.

7. The rack of claim 1, wherein the reverse side has a position for an RFID tag.

8. The rack of claim 1, wherein the front side and/or a smaller end wall has a position for barcodes.

9. The rack of claim 8, wherein the smaller end wall comprises a magnet configured for detection of the rack.

10. The rack of claim 1, wherein at least one of the plurality of second openings of the single upper insert comprises a whole tube insert having a smaller volume than the corresponding slot configured to receive the container comprising the sample.

11. The rack of claim 1, wherein the rack has at its underside at least one recess for taking up protrusions of a conveyer belt.

12. A method of using a rack according to claim 1 in automated analyser systems for processing, analysing or diagnosing samples, comprising the steps of:
   arranging the single upper insert at the top of the rack's main body, wherein the single upper insert forms the rack's upper side, and wherein the single upper insert has the plurality of second openings which define a diameter for a container comprising a sample; and
   inserting the container comprising the sample into the rack through the centered diameter of a second opening of the plurality of second openings of the single upper insert.

* * * * *